United States Patent [19]

Hembree et al.

[11] Patent Number: 4,793,153
[45] Date of Patent: Dec. 27, 1988

[54] ENERGY RECOVERY APPARATUS

[75] Inventors: Richard D. Hembree; David E. E. Carmein, both of Minneapolis, Minn.

[73] Assignee: Recovery Engineering, Inc., Minneapolis, Minn.

[21] Appl. No.: 62,232

[22] Filed: Jun. 12, 1987

[51] Int. Cl.[4] .............................................. F25B 15/00
[52] U.S. Cl. ...................................... 62/476; 62/483; 62/487
[58] Field of Search .......................... 62/483, 487, 476

[56] References Cited

U.S. PATENT DOCUMENTS

| | | | |
|---|---|---|---|
| 1,866,825 | 7/1932 | Smith . | |
| 2,906,101 | 9/1959 | McMahon et al. | 62/6 |
| 2,986,898 | 6/1961 | Wood, Jr. . | |
| 3,046,756 | 7/1962 | Whitlow et al. | 62/483 X |
| 3,077,087 | 2/1963 | Japhet | 62/324.1 |
| 3,234,746 | 2/1966 | Cope | 62/55 |
| 3,293,881 | 12/1966 | Walker | 62/476 |
| 3,296,823 | 1/1967 | Novak et al. | 62/487 X |
| 3,296,824 | 1/1967 | Rohrs et al. | 62/487 |
| 3,319,432 | 5/1967 | Nebgen | 62/45 |
| 3,369,373 | 2/1968 | Merrick | 62/141 |
| 3,418,825 | 12/1968 | Russell | 62/483 |
| 3,460,440 | 8/1969 | Brent | 91/447 |
| 3,473,347 | 10/1969 | Andrews et al. | 62/476 |
| 3,604,822 | 9/1971 | Saxe | 417/339 |
| 3,823,573 | 7/1974 | Cassady | 62/238.3 |
| 3,855,794 | 12/1974 | Meyer et al. | 60/546 |
| 4,024,715 | 5/1977 | Scragg et al. | 60/641 |
| 4,068,476 | 1/1978 | Kelsey | 60/671 |
| 4,235,079 | 11/1980 | Masser | 62/87 |
| 4,285,211 | 8/1981 | Clark | 62/335 |
| 4,314,447 | 2/1982 | Gray | 60/671 |
| 4,391,571 | 7/1983 | Craggs | 417/403 |
| 4,393,653 | 7/1983 | Fischer | 60/511 |
| 4,474,025 | 10/1984 | Alefeld | 62/148 |
| 4,619,119 | 10/1986 | Dijkstra et al. | 62/324.2 |
| 4,646,541 | 3/1987 | Reid, Jr. et al. | 62/476 |
| 4,679,409 | 7/1987 | Fitt | 62/483 X |

Primary Examiner—Lloyd L. King
Attorney, Agent, or Firm—Merchant, Gould, Smith, Edell, Welter & Schmidt

[57] ABSTRACT

An energy recovery pump-motor including an energy recovery pump and a mixed-phase motor for replacing conventional valves in fluid circuits such as an absorption refrigeration system. The energy recovery pump pressurizes a first liquid by recovering flow work energy from a second liquid. The mixed-phase motor recovers flow work energy and expansion energy from a high pressure, saturated third liquid and transfers the energy along a shaft to the pump to aid in pressurizing the first liquid. The energy recovery pump is shown in a single effect absorption refrigeration system, while the pump-motor is shown in both single effect and double effect systems.

7 Claims, 6 Drawing Sheets

ENERGY RECOVERY APPARATUS

FIELD OF THE INVENTION

The present invention is directed to devices capable of recovering energy otherwise lost in refrigeration or heating fluid circuits. The present invention relates to integrating a device comprising an energy recovery pump and a mixed-phase motor for use in a fluid circuit, typically an absorption refrigeration system.

BACKGROUND OF THE INVENTION

Figure 1:
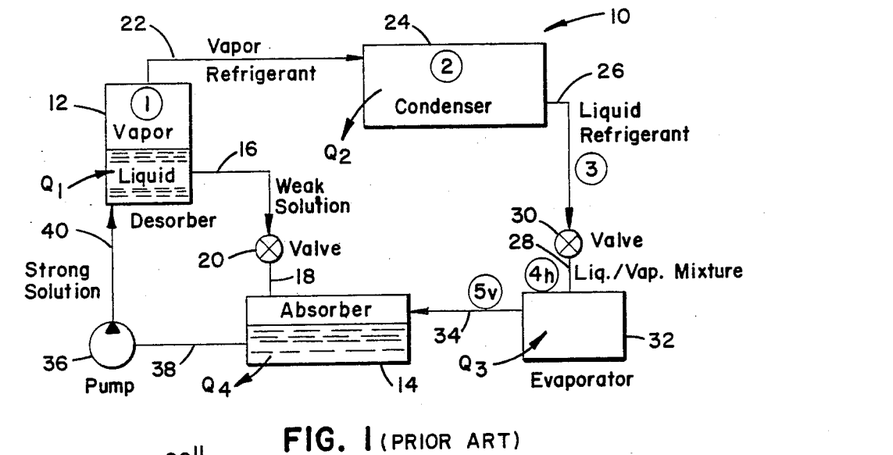
FIG. 1 is a schematic illustration of a prior art absorption refrigeration system.

The present invention is particularly applicable to an absorption refrigeration fluid system. The essentials of such a system are shown in FIG. 1 (although heat exchangers are omitted for the sake of clarity). In a typical system like that of FIG. 1, a refrigerant, e.g., water or other phase change material, is dissolved in an absorbent, e.g., lithium bromide or some other salt. The two materials are often called a "solution pair." The refrigerant is absorbed or desorbed in or out of solution with the absorbent to varying degrees throughout the system, and the heat of absorption is added or extracted to produce heating or cooling effects. Another common solution pair used in an absorption refrigeration system is ammonia as the refrigerant and water as the absorbent.

With reference to FIG. 1, the solution enters the desorber 12 (sometimes called a generator). Heat, Q1, is added to desorber 12. Refrigerant boils off as a vapor leaving what is termed a weak solution. The weak solution reruns to absorber 14 via lines 16 and 18 through valve 20. The vapor refrigerant flows via line 22 to condenser 24. External ambient cooling condenses the refrigerant vapor to a liquid, giving off heat, Q2. The liquid refrigerant flows via lines 26 and 28 through valve 30 to evaporator 32. In a refrigeration system, the heat, Q3, gained in the evaporator is from the cooling load. The vaporized refrigerant flows from evaporator 32 via line 34 to absorber 14. The vapor refrigerant is mixed with weak solution in absorber 14, giving off heat, Q4, to create strong solution which is then pumped at pump 36 through lines 38 and 40 from absorber 14 to desorber 12 so that the cycle may continue. Although not shown, system 10 ordinarily inclues a first heat exchanger of some type to include lines 40 and 16 and a second heat exchanger to include lines 26 and 34.

The strong solution in an absorption refrigeration system is a liquid and, consequently, is more easily pumped and pressurized than a vapor. Nevertheless, mechanical energy is added to the system at pumpt 36. The after refrigerant is vaporized with externally added heat and separated from the strong solution. The refrigerant is liquified and reduced in pressure so that, as indicated, at the evaporator, heat may be readily and beneficially absorbed. Thus, valve 30 functions to controllably reduce the pressure of the liquid refrigerant from condenser 24. Typically, the refrigerant is saturated or nearly saturated at that time so that when it passes through valve 30, some of its changes phase and is vaporized. To the degree pressure is reduced and a phase change takes place, energy is lost. Additionally, the weak solution from desorber 12 is depressurized to mix with the depressurized refrigerant in absorber 14. Consequently, energy is again lost at valve 20. thus, although an absorption refrigeration system is widely used, the conventional system requires a significant amount of energy and, once used, rejects it without revising or recovering it. The strong solution is pressurized so that the heat rejection portion of the thermodynamic cycle of the refrigerant may take place at a temperature and pressure level which allows the subsequent heat absorption portion of the cycle to take place at a useful level relative to the heat sink, i.e., the environment to be beneficially cooled.

U.S. Pat. No. 1,866,825 shows an expansion engine in the form of helical gears for expanding vapor leaving a desorber and also expanding weak solution leaving the desorber to reduce the heat and high pressure of each fluid and recover the energy thereby to help drive a pump for the strong solution. Smith understands the loss of energy in usual absorption refrigeration systems and presented a device intended to recover some of that energy. The device of Smith, however, was apparently never successful. In any case, a helical gear-type engine is complex and undoubtedly excessively expensive in a modern economy.

U.S. Pat. No. 4,646,541 indicates that various types of motors could be used to reduce pressure in the weak solution and liquid refrigerant streams of an absorption refrigeration system to recover some energy and reduce the requirement of external power for the pump. An expansion, rotary-turbine type engine is disclosed. Although not as complicated as a helical gear engine, a turbine type engine does not provide positive fluid control and presents sealing and other engineering challenges.

Thus, the art does not teach piston devices for recovering the energy in an absorption refrigeration system. In this regard, however, although not a piston device, U.S. Pat. No. 3,791,768 shows a dual chamber diaphragm fluid pump wherein energy from one stream could be used to pump energy in another stream.

As a consequence, the present invention is directed to recovering energy with piston devices from locations in fluid circuits where valves are now commonly used to provide a controlled depressurization.

SUMMARY OF THE INVENTION

The present invention is directed to energy recovery apparatus and an absorption refrigeration and/or heating system in which such apparatus is incorporated. The energy recovery apparatus includes a piston pump and a piston motor, wherein there is mechanism for connecting the pistons of each for simultaneous movement, as well as mechanism for switching from one pump stroke to another and from one motor stroke to another at the same time. The pump includes a first cylinder with a first piston therein to divide the first cylinder into a driving chamber and a pumping chamber. The pump has mechanism for filling the pumping chamber with a first liquid of first pressure. The pump further has mechanism for driving the first piston in a pumping stroke with a second liquid at a second pressure. The pump also includes mechanism for releasing the first liquid from the pumping chamber during the pumping stroke. The pump further includes first mechanism for returning the first piston in a filling/exhausting stoke. The pump also has first mechanism for exhausting the second liquid from the driving chamber during the filling/exhausting stroke. The motor of the energy recovery apparatus has a second cylinder with a second piston therein to divide the second cylinder into a charging and an exhausting chamber. The motor has mechanism for charging the charging chamber with a third liquid at a third pressure. The motor further has mechanism for partially vaporizing the third liquid from the charging chamber into the exhausting chamber thereby driving the second piston in a power stroke. The motor further has mechanism for exhausting the spent third liquid/vapor fluid which is now at a pressure lower than the third pressure. In addition, the motor has second means for returning the second piston during the charging/exhausting stroke.

Although in the most general embodiment as indicated, the pump has a piston and the motor has a piston, in a preferred embodiment, each of the pump and motor have aligned dual chambers with a piston in each and with the pistons connected to one another. Furthermore, as indicated, the set of pistons from the pump are connected with the set of pistons from the motor so that they operate in tandem. In this way, the pump not only advantageously recovers energy from a high pressure stream of liquid and uses it to pump a lower pressure stream, but the motor aids in this process by recovering energy from a high pressure, saturated liquid stream which gives up primarily expansion energy during a phase change.

An absorption refrigeration and/or heating system may advantageously include energy recovery devices. In a general system, an absorption refrigeration and/or heating fluid circuit includes a desorber, a condenser, an evaporator, an absorber, and mechanism for fluidly communicating between these various devices. The desorber absorbs heat and at a relatively high pressure vaporizes a first volume of refrigerant from a second volume of strong solution to result in a third volume of weak solution. The condenser releases heat and condenses the vapor refrigerant to liquid refrigerant at the high pressure. The evaporator absorbs heat and evaporates the liquid refrigerant at the low relative pressure. The absorber releases heat and absorbs the evaporated refrigerant into the weak solution at the low pressure to form new strong solution. The fluid communicating mechanism includes devices for increasing and decreasing pressure as appropriate. In accordance with the present invention, the communicating mechanism includes mechanism for recovering energy from the high pressure weak solution in order to pump the low pressure, strong solution. At the same time, second liquid at a lower pressure exhausts from driving chamber 80 via lines 104 and 110 through valve 106. The energy recovery mechanism includes first and second aligned cylinders with first and second pistons therein, respectively, and a rod connecting the pistons together. The energy recovery mechanism is structured so that the square of the ratio of the rod diameter to the cylinder diameter is equal to the ratio of the volume of the refrigerant vaporized in the desorber to the volume of strong solution entering the desorber. The present invention in this general form is particularly advantageous in that definite flow control is maintained with respect to the various fluids, i.e., the strong and weak solutions and the refrigerant, as indicated. Such control is possible through the use of a piston device structured as described in detail hereafter.

In a preferred embodiment, the energy recovery apparatus used in the absorption refrigeration and/or heating system includes a motor as described hereinbefore. In this way, the energy recovery pump advantageously recovers hydraulic or flow work energy from the liquid weak solution, while the motor recovers both hydraulic energy and phase change expansion energy from the liquid refrigerant as it passes from the condenser and partially vaporizes on its way to the evaporator. The energy recovered is used to pump strong solution from the absorber to the desorber.

Although the invention has been thusly summarized, preferred and other embodiments and the advantages of the invention are further described and explained and may be better understood by reference to the following drawings and the detailed descriptive matter thereafter.

DETAILED DESCRIPTION OF PREFERRED AND OTHER EMBODIMENTS

Figure 4A:
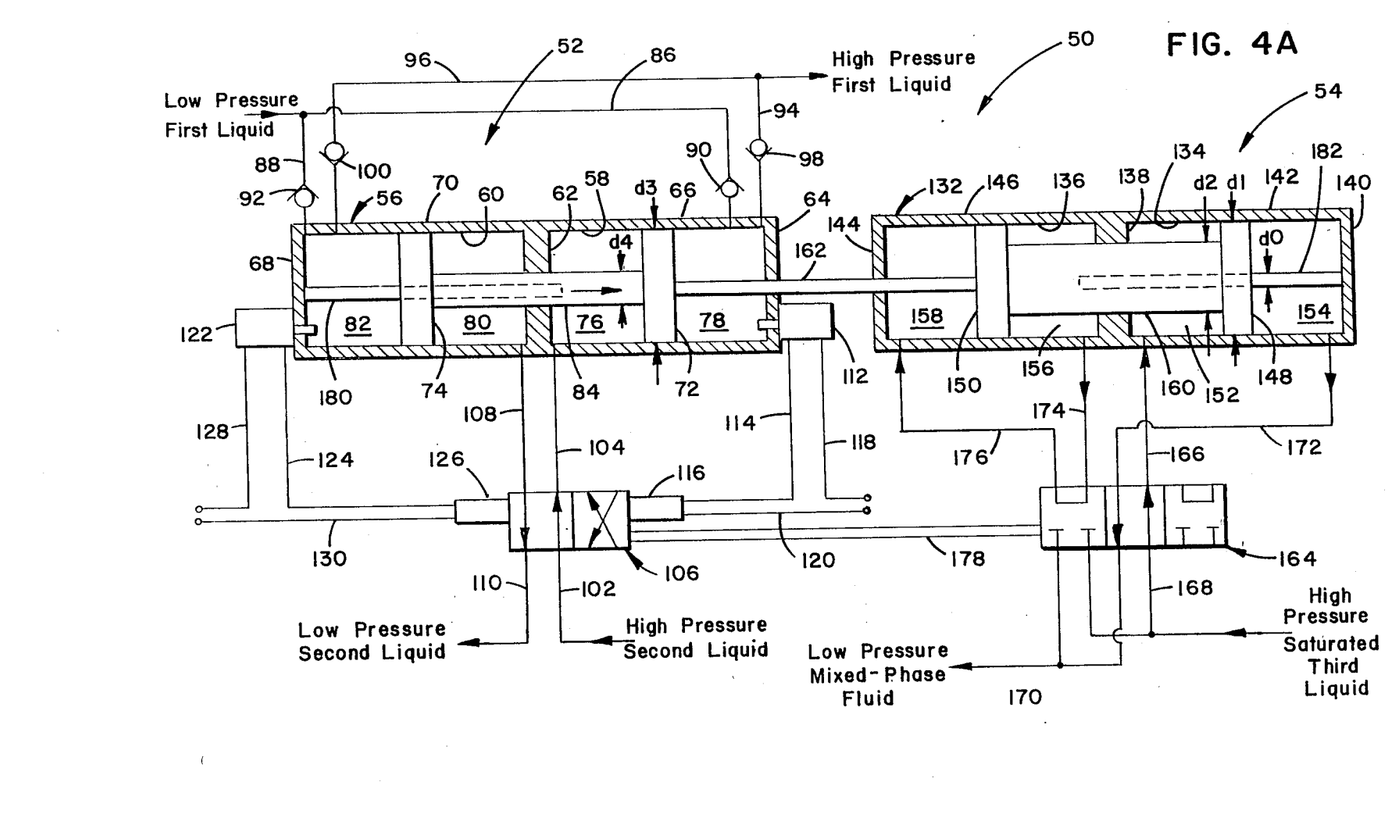
FIGS. 4A and 4B are schematic illustrations of the energy recovery pump-motor showing configurations for oppositely directed strokes of the pistons in accordance with the present invention.
Figure 4B:
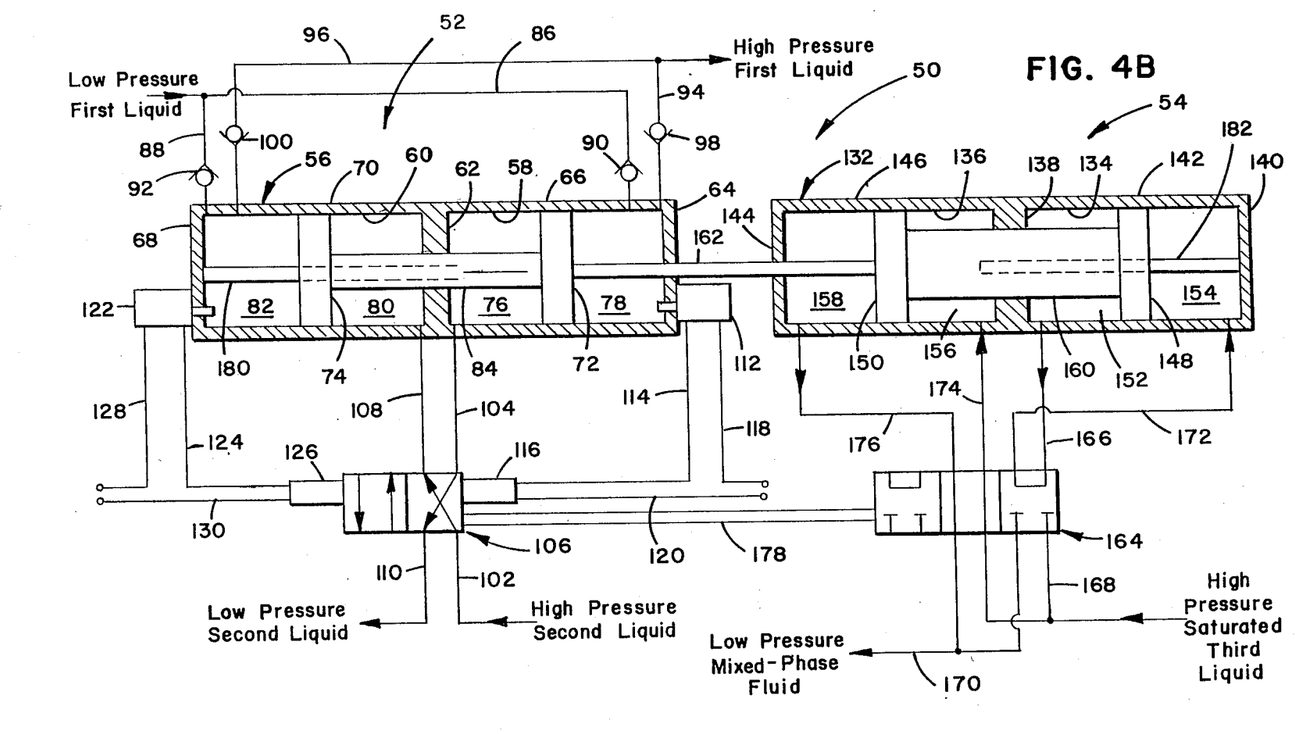

Referring now to the drawings wherein like reference numerals designate identical or corresponding parts throughout the several view and, more particularly to FIGS. 4A and 4B, an energy recovery pump-motor in accordance with the present invention is designated generally by the numeral 50. FIG. 4A shows pump-motor 50 in a first configuration wherein a first piston from each of pump 52 and motor 54 are in a pumping or power stroke, while FIG. 4B shows recovery pump-motor 50 in a second configuration wherein a second piston of each of pump 52 and motor 54 is in a power stroke, while the first piston is returning and serving a filling, charging or exhausting function. Considering FIG. 4A, energy recovery pump 52 includes a casing 56 which forms first and second cylinders 58 and 60 on opposite sides of a common wall 62. Casing 56 includes with respect to cylinder 58 a wall 64, opposite common wall 62 with a wall 66 therebetween to form the cylindrical cavity. Similarly, casing 56 includes with respect to second cylinder 60 a wall 68 opposite common wall 62 with a wall 70 therebetween to form another cylindrical cavity.

Pump 52 includes first and second pistons 72 and 74 which divide first and second cylinders 58 and 60 into first and second driving and pumping chambers 76, 78, 80 and 82, respectively. A rod 84 extends through common wall 62 and attaches at opposite ends to pistons 72 and 74. Rod 84 passes through driving chambers 76 and 80. As in other similar applications throughout this disclosure, it is understood that seals, bearings and other such mechanisms are used with respect to the pistons, rods, shafts, etc. in a fashion known to those skilled in the art.

Pump 52 is structured so that a low pressure, first liquid is pumped to a higher pressure by a high pressure, second liquid which then exhausts at a lower pressure. The low pressure, first liquid alternately enters one of pumping chambers 78 and 82 of casing 56 via lines 86 and 88 through check valves 90 and 92, respectively. The first liquid alternately exhausts from one of pumping chambers 78 and 82 via lines 94 and 96 through check valves 98 and 100, respectively. As shown in FIG. 4A, in a first half cycle with valve 106 is in its first position, the high pressure, second liquid enters driving chamber 76 via lines 102 and 104 through valve 106. At the same time, second liquid at a lower pressure exhausts from driving chamber 80 via lines 108 and 110 through valve 106. As shown in FIG. 4B, in a second half cycle, with valve 106 in its second position, the high pressure, second liquid enters driving chamber 80 via lines 102 and 108 through valve 106. At the same time, second liquid at a lower pressure exhausts from driving chamber 80 via lines 104 and 110 through valve 106.

For similar reasons, check valve 92 opens so that pumping chamber 82 fills with low pressure, first liquid at the same time, low pressure second liquid exhausts from driving chamber 80. When valve 106 changes position from the first position shown in FIG. 4A to the second position shown in FIG. 4B, first liquid flows into driving chamber 80 and flows from driving chamber 76 so that pistons 72 and 74 change direction of travel. In FIG. 4B, high pressure, second liquid flows into driving chamber 80 and hydraulically expends energy to drive piston 74, thereby pumping high pressure, first liquid from pumping chamber 82. In this case, the pressurizing of first liquid in pumping chamber 82 keeps check valve 92 closed and allows check value 100 to open. Check valve 90 opens so that pumping chamber 78 fills pressure, second liquid exhausts from driving chamber 76.

Operationally in FIG. 4A, high pressure, second liquid flows into driving chamber 76 and hydraulically expends energy to drive piston 72, thereby pumping high pressure, first liquid from pumping chamber 78. The pressurizing of first liquid in pumping chamber 78 keeps check valve 90 closed and allows check valve 98 to open.

Pistons 72 and 74 preferably travel to near the end walls of first and second cylinders 58 and 60. A limit switch 112 senses piston 72 as it approaches end wall 64. Limit switch 112 communicates electrically via line 114 with solenoid 116 of valve 106 which causes valve 106 to switch from its first position to its second position. Switch 112 and solenoid 116 are in electrical communication with an electrical source via lines 118 and 120.

Likewise, when piston 74 is in a pumping stroke and approaches end wall 68, limit switch senses piston 74 and communicates via line 124 with solenoid 126 of valve 106. Switch 122 and solenoid 126 are in electrical communication with an electrical source via lines 128 and 130.

Motor 54 includes a casing 132 which is similar to casing 56. Casing 132 forms first and second cylinders 134 and 136 with a common wall 138 therebetween. Casing 132 includes an end wall 140 opposite common wall 138 with a wall 142 extending therebetween to form the cavity of first cylinder 134. Casing 132 also includes an end wall 144 opposite common wall 138 with wall 146 extending therebetween to form the cavity of cylinder 136.

First and second pistons 148 and 150 divide first and second cylinder 134 and 136 into first and second charging and exhaust chambers 152, 154, 156 and 158, respectively. A rod 160 extends through common wall 138 and attaches at opposite ends to first and second pistons 148 and 150. Rod 160 also extends through charging chambers 152 and 156. A drive shaft 162 provides a solid connection between piston 72 of pump 52 and piston 150 of motor 54. Drive shaft 162 extends through exhaust chamber 158 and end wall 144 of motor 54, as well as through end wall 64 and pumping chamber 78 of pump 52. Drive shaft 162 transfers energy recovered by motor 54 to pump 52 thereby allowing pump 52 to pressurize the first liquid to a greater level than would otherwise be possible.

Motor 54 also includes a six-way two position valve 164. Valve 164 has a first position, as shown in FIG. 4a, placing charging chamber 152 in fluid communication with the high pressure, saturated third liquid via lines 166 and 168 through valve 164 and placing exhaust chamber 154 in fluid communication with drain line 170 via line 172 and valve 164. At the same time, what was charging chamber 156 and exhaust chamber 158 are placed in fluid communication with one another through valve 164 via lines 174 and 176 to form a single motor chamber. In this way, the high pressure saturated third liquid in the charging chamber 156 portion of the unified motor chamber expands into the exhaust chamber 158 portion. In doing so, at least a portion of the liquid changes phase to become a vapor and forces piston 150 toward common wall 138. At the same time, hydraulic or flow work energy is expended on piston 148 as charging chamber 152 is filled. Expended liquid/vapor exhausts from exhaust chamber 154.

To insure that valve 106 of pump 52 and valve 164 of motor 54 change position at the same time, a rod 178 is illustrated as connecting the two valves together. It is understood that rod 178 is illustrative of the necessity to shift the valves at the same time and that the particular mechanism could be electrical or of some other appropriate type. In any case, since valves 106 and 164 shift at the same time, the switches 112 and 122 operating solenoids 116 and 126 also function to sense the ends of travel of the pistons so that separate sensing devices are not needed for motor 54. In this regard, it is understood that the sensing devices could be associated with motor 54 instead of pump 52 or that one device on one of pump 52 and motor 54 could sense the end of travel in one direction of the various pistons, while another device on the other of pump 52 and motor 54 could sense the end of travel of the pistons in the other direction. It is further understood that the switches 112 and 122 could take a variety of forms. They could sense, for example, motion based on mechanical, electrical, magnetic, hydraulic or other physical principles. In like fashion, they could communicate with the relevant valve via a signal that is mechanical, electrical, magnetic, hydraulic or a signal of some other physical type. The important consideration is that the end motion of the pistons is sensed in both directions and that an appropriate signal is sent to the control mechanism for switching the valves.

It is preferable to maintain symmetry between the sides of pump 52. In this way, each side will function 180° out of phase with the other, and there is no need for synchronizing mechanism or concern of mechanical lockup. Thus, it is understood that the cylinders and pistons have similar diameters and lengths and that rod 160 has a constant diameter. Since pump 52 functions with liquids which are essentially incompressible, the reduction of chamber 78 by the presence of drive shaft 162 must be compensated for in chamber 82. Therefore, to maintain the symmetry of pumping chambers 78 and 82, a dummy shaft 180 extends from piston 74 to wall 68 at all points along the travel of piston 74. Dummy shaft 180 may telescope into piston 74 and connecting rod 84 as illustrated by the broken lines, or dummy shaft 180 may extend through wall 68 (not shown) and reciprocate as appropriate. It is noted that if dummy shaft 180 were to extend through wall 68, it could transfer energy to another use device.

Likewise, it is preferable for symmetry to be maintained with respect to exhaust chambers 154 and 158 of motor 54. In this regard, a dummy shaft 182 must extend from piston 148 to wall 140 at all points along the travel of piston 148. As with dummy shaft 180, dummy shaft 182 may telescope into piston 148 and main shaft 160, as indicated by the broken lines, or it could also extend through wall 140 and reciprocate as appropriate. With respect to dummy shaft 182, however, its presence is not necessarily required. Since a high pressure, saturated third liquid at least partially vaporizes during the power stroke of one or the other of the pistons, the vapor could compress or expand as necessary to compensate for any assymetry.

FIG. 4B is the same as FIG. 4A, except valve 164, along with valve 106, is shown in a second position. Consequently, a high pressure, saturated, third liquid is filling charging chamber 156. Spent liquid/vapor is exiting exhausting chamber 158. Charging chamber 152 and exhausting chamber 154 are in fluid communication with one another to form a single motor chamber for the power stroke of piston 148.

It is observed that motor 54 is more fully described in a patent application, hereby incorporated by reference, having the same inventorship and filing date as the present application and assigned to the same corporate entity.

Operation

The energy recovery pump 52 and the mixed phase motor 54 of the energy recovery pump-motor 50 operate in unison with respect to one another. Since each uses different fluids of the fluid system in which a recovery pump-motor is incorporated, for the sake of clarity the operation of each is separately described. Because of the requirement that the valves shift at the same time and the pistons be mechanically connected together, it is clear, however, that the two devices cooperate to transfer energy from the second and third liquids to the first liquid.

With reference to FIG. 4A, low pressure first liquid enters the front of cylinder 60, otherwise called pumping chamber 82. The first liquid enters through intake check valve 92. First liquid does not flow through check valve 90 into the front of cylinder 58 because the pressure on that side of the pump is at the higher pumping pressure. At the same time, high pressure second liquid flows through four-way valve 106 and enters the back of cylinder 58, otherwise called driving chamber 76. The combination of the pressures of these two incoming liquids move the pistons to the right, as shown by the arrow. As a consequence, fluid in front of piston 72, that is, fluid in pumping chamber 78, is forced out through check valve 98 at the higher pump pressure. The piston motion also forces the now-depressurized second liquid from the back of piston 74, that is, from driving chamber 80, through valve 106 to a lower pressure drain line. When the end of the stroke is reached, sensing device 112 senses piston 72 and sends a signal to solenoid 116 to shift valve 106 thereby reversing the flow of the second liquid with respect to cylinders 58 and 60 and which shortly thereafter causes the flow of first liquid with respect to cylinders 58 and 60 to reverse. The valve switching and reversal of flow with respect to cylinders 58 and 60, in turn, reverses the direction of travel of pistons 72 and 74, so that pump 52 operates in the same fashion in the reverse direction and then continues to cycle.

Mixed phase motor 54 captures flow-work or hydraulic energy from the high pressure third liquid, and also captures expansion energy when the saturated third liquid drops in temperature and pressure to form a mixture of vapor and liquid. Useful energy extraction in these two forms appears as linear shaft work at drive shaft 162.

Motor 54 is shown in FIGS. 4A and 4B with dual cylinders and connected pistons. In FIG. 4A, charging chamber 152 is filling with high pressure third liquid through valve 164. Some flow-work is done on piston 148 as the fluid expands charging chamber 152. Exhausting chamber 154, on the other side of piston 148, contains a lower temperature and pressure liquid/gas mixture which is exhausting through valve 164. What were charging and exhausting chambers 156 and 158 in the other cylinder of motor 54 are in fluid communication with one another through valve 164 to form a single motor chamber. The hot pressurized liquid/vapor mixture in combined chambers 156 and 158 seeks an equilibrium pressure based on available volume. The pressure acts on the entire area of the face of piston 150 less the small area represented by the cross-section of drive shaft 162. Such force is only opposed by the force applied by the pressure to the very small area of piston 150 facing into charging chamber 156. Since main shaft 160 has a relatively large diameter, the face area of piston 150 on the chamber 158 side is significantly greater than the area of the face of piston 150 on the chamber 156 side. Therefore, when chambers 156 and 158 are placed in fluid communication with one another, fluid pressure equalizes and when acting on the larger area causes a force to expand chamber 158 and move piston 150. The expansion energy on piston 150, along with the flow-work energy on piston 148, transmits force along drive shaft 162.

When pistons 148 and 150 reach the full extent of intended travel, valve 164 switches in response to the connection with valve 106 of pump 52, represented by shaft 178. Because of the structure of shaft 162 between the pistons of motor 54 and pump 52, all pistons have a similar travel. Preferably, the cylinders have length only slightly greater than the piston travel. In this way, when sensing switch 112 senses the end of travel of piston 72 or when sensing switch 122 senses the end of travel of piston 74, the stroke of any particular piston moves through most of the length of the particular cylinder. In any case, when valve 164 switches, charging chamber 152 and exhausting chamber 158 are at maximum volume, while exhausting chamber 154 and charging chamber 156 are at minimum volume. As shown in FIG. 4B, when valve 164 changes position, charging chamber 156 is open to the high pressure, saturated third liquid and exhausting chamber 158 is open to exhaust. At the same time, chambers 152 and 154 are placed in fluid communication with one another to form a motor chamber and begin the power stroke of piston 148. When pistons 148 and 150 reach the extent of travel in the opposite direction, switching again takes place and the motor continues to cycle.

Ideally, the pressure of the liquid/gas mixture leaving either of the exhaust chambers when they function as exhaust chambers, and the pressure in drain line 170 are the same. If the spent mixed-phase mixture has not been expanded sufficiently, the mixture expands further into drain valve 170, as valve 164 switches and work is lost. If the spent mixed-phase mixture has been expanded too much, flow in drain line 170 reverses to fill the exhausting chamber temporarily when valve 164 shifts.

Coupling the shaft work output of drive shaft 162 of motor 54 to the shaft work of rod 84 of pump 52 results in pump-motor 50 energy recovery. Pump-motor 50 thus captures both flow-work from all of first, second and third liquids to some degree, primarily however from the high pressure liquids, and expansion work from the saturated third liquid and transfers the energy to flow-work by pressurizing and pumping the first liquid.

When energy from the various streams is insufficient to raise first liquid pressure as desired, a standard pump may be added.

The pistons of pump 52 and notor 54 are coupled together. In addition, the switching valve 106 of pump 52 is connected with the switching valve 164 of motor 54. They must both shift at the same time to avoid hydraulic lock up of pump-motor 50. Timing of the switching may be based on any of several criteria, for example, piston reaching the end of a chamber, pressure within the chamber, etc. In any case, the various pistons need not travel the full extent possible. Incomplete travel allows for adjustment of the ratios of initial and final volumes of work extraction from motor 54. Full travel, however, provides optimum use of available expansion volumes, provided the motor has been properly sized for the fluid properties of the system in which pump-motor 50 is incorporated.

System Applications

Figure 3:
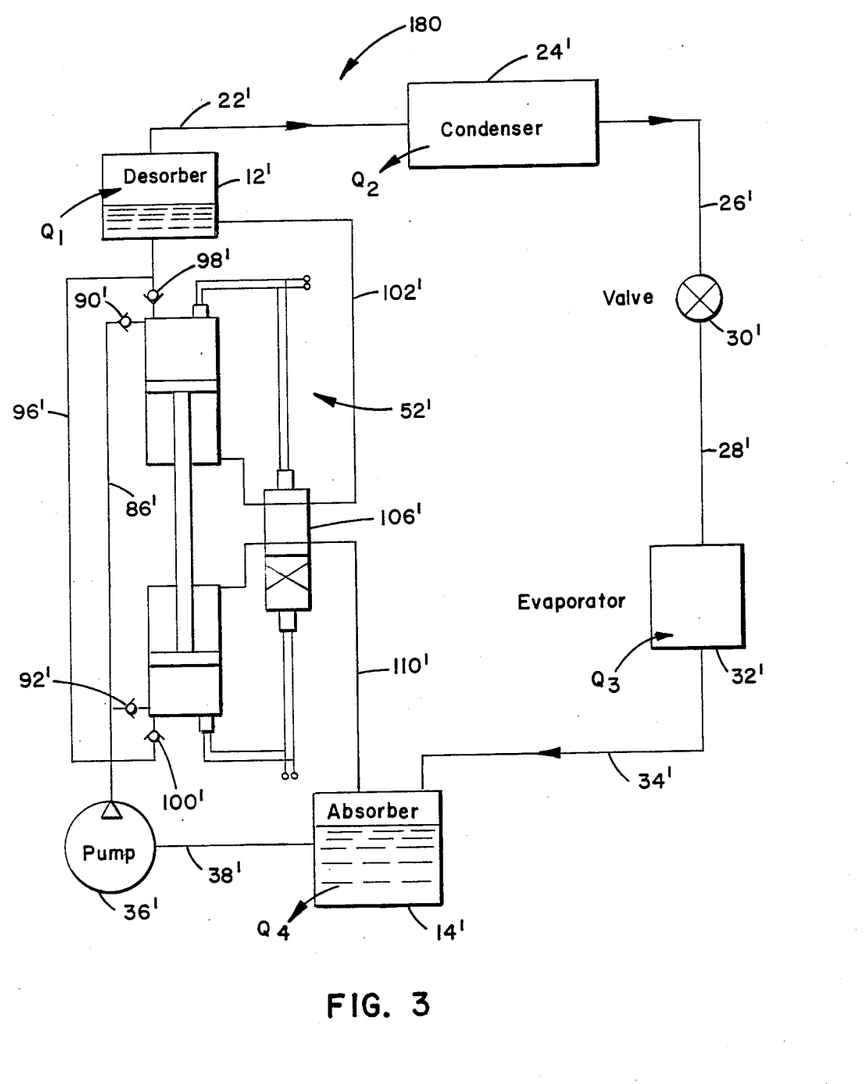
FIG. 3 is a schematic illustration similar to FIG. 2 incorporating an energy recovery pump in accordance with the present invention.

A conventional absorption refrigeration and/or heating system is shown in FIG. 1 and designated by the numeral 10. System 10 was described hereinbefore. A system 180 which replaces valve 20 of system 10 with an energy recovery pump 52' is shown in FIG. 3. In this regard, it is noted that hereinafter alternate embodiments and components thereof are designated by identical numerals as earlier used, except the numerals are primed to distinguish among the embodiments. As indicated, pump 52' is installed in place of valve 20 to recover energy from the weak solution depressurized thereby and is inserted in line 40 of FIG. 1. In that way, pump 36 of FIG. 1 need not supply all the energy needed to raise the pressure of the strong solution.

With respect to pump 52', it is noted that it is being used independently of motor 54 so that there is no drive shaft 162 or dummy shaft 108, and there is no connecting shaft 178 or other mechanism for connecting with a valve of motor 54. In all other respects, pump 52' is the same as pump 52, and the description given hereinbefore is accurate with respect to pump 52'.

With respect to installation in system 180, line 102' directs high pressure, weak solution flow from desorber 12' to an input of valve 106'. Low pressure, weak solution output of valve 106' is directed along line 110' to absorber 114'. Low pressure, strong solution is directed from pump 136' along line 86' to one of check valves 90' and 92'. High pressure, strong solution pumped by energy recovery pump 52' flows from one of check valves 98' and 100' along line 96' to desorber 12'.

The rest of system 180 is similar to system 110 in that vapor refrigerant flows from desorber 12' along line 22' to condenser 24'. Liquid refrigerant then flows from condenser 24' along line 26' to be depressurized at valve 30' before being directed by line 28' to evaporator 32'. Evaporated refrigerant flows from evaporator 32' along line 34' to absorber 14'. From absorber 14', low pressure strong solution is partially pressurized by pump 36' before being elevated to desired high pressure by energy recovery pump 52'.

Correct operation of a system like system 110 hinges on correct flow rates of refrigerant and working fluid in its strong and weak form. An energy recovery pump 52' is particularly advantageous because of its positive displacement flow regulation characteristics. Pump 52' provides simple and direct means for fixing optimal mass flow ratios of fluids. System control problems are minimized.

Whereas leak rate are rather high in gear-type and van-type pumps and motors, a piston device like pump 52' advantageously has low leak rates to essentially no leakage. This further ensures conclusively determinable flow ratios, whereas in other types of devices varying degrees of leakage must be accounted for.

An additional advantage with an energy recovery pump 52' is that a piston-type device has substantially lower mechanical friction losses than other devices and is therefore more efficient. Additionally, fluid friction losses are also substantially lower, leading to yet higher efficiency.

Figure 2:
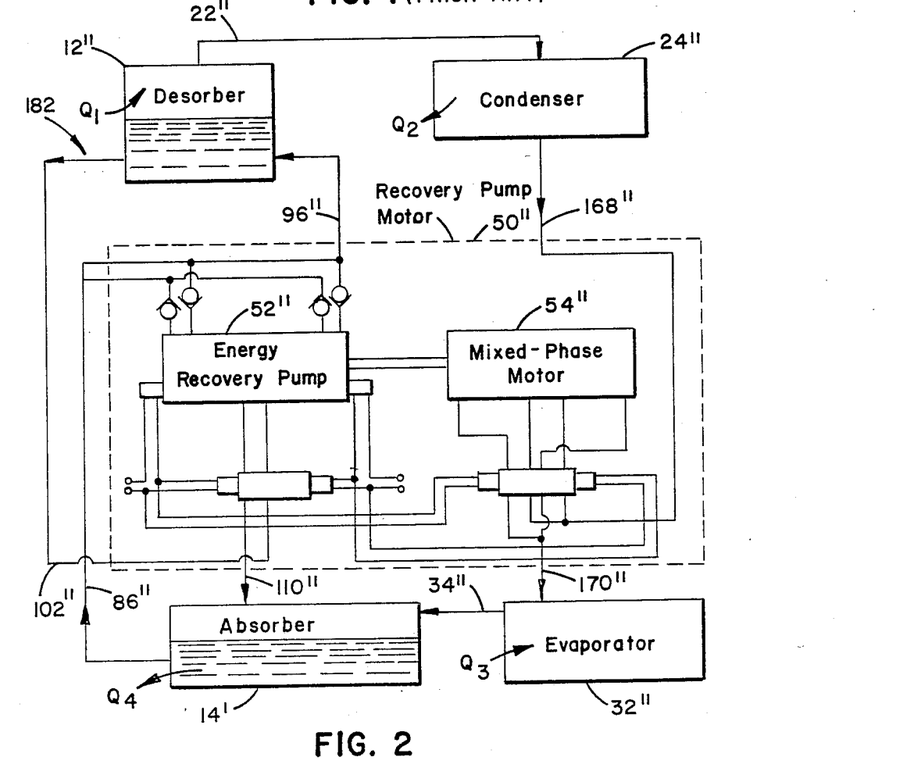
FIG. 2 is a schematic illustration of an absorption refrigeration system incorporating the energy recovery pump-motor in accordance with the present invention.

Whereas energy recovery pump 52' replaces one valve and supplies at least some of the pumping capacity, an energy recovery pump-motor, such as 50, can be used to replace two valves and a pump. In this regard, as shown in FIG. 2, a system 182 incorporates a pump-motor 50 to replace pump 36, valve 20 and valve 30 of system 10.

Energy recovery pump-motor 50" is exactly the same as that described with respect to FIGS. 4A and 4B. Low pressure, strong solution from absorber 14" is directed through line 86" to pump 52". High pressure, strong solution leaves pump 52" along line 96" to desorber 12". High pressure, weak solution leaves desorber 12" along line 102" and is directed to pump 52". Expended low pressure, weak solution leaves pump 52" along line 110" leading to absorber 14". Vapor refrigerant flows from desorber 12" to condensor 24" via line 22". High pressure, liquid refrigerant leaves condenser 24" via line 168" to flow to mixed-phase motor 54". The spent low pressure, mixed-phase liquid/vapor from motor 54" is directed via line 170" to evaporator 32". Evaporated refrigerant flows from evaporator 32" to absorber 14" via line 34".

Pump-motor 50 is particularly advantageous with respect to system 182 in that pump 36 of system 10 may be completely eliminated since the energy recovered in replacing valve 20 and 30 of system 10 is ordinarily more than sufficient to pump strong solution to the desired high pressure. It is noted, however, that it may be desirable to use a small pump to regulate flow and provide start up flow.

Pump-motor 50 is further advantageous with respect to system 182 in that the refrigerant leaving motor 54"

for evaporator 32″ has a greater liquid to vapor ratio than occurs in system 10. As a result, heat, Q3, extracted from the environment to evaporator 32″ is increased. In other words, in a refrigeration mode, greater cooling at less cost is achieved.

Figure 5:
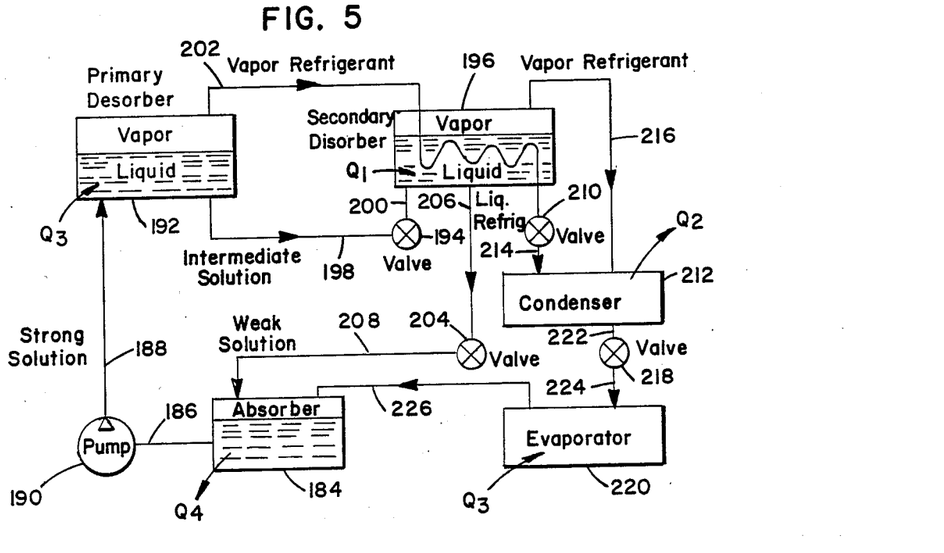
FIG. 5 is a schematic illustration of a prior art double effect absorption refrigeration system.

Another application of pump-motor 50 in accordance with the present invention relates to a double-effect absorption refrigeration and/or heating system. A conventional system of the prior art is shown in FIG. 5. Strong solution leaving absorber 184 is directed via lines 186 and 188 through pump 190. Strong solution entering primary desorber 192 at high pressure forms an intermediate strength solution after high pressure refrigerant is evaporated off by heat addition, Q1. Intermediate strength solution thus formed is throttled through valve 194 to secondary desorber 196 via lines 198 and 200. Heat is added to the secondary desorber 196 from both Q1′ and by condensation of high pressure refrigerant evaporated in primary desorber 192 and passed through secondary desorber 196 via line 202. Weak solution from the secondary desorber then passes through valve 204 to the low pressure absorber 184 via lines 206 and 208.

High pressure, high temperature, liquid refrigerant condensed in secondary desorber 196 is throttled through valve 210 to form a liquid/vapor mixture which enters condenser 212 via line 214. This mixture combines with the vapor refrigerant evaporated in secondary desorber 196 and directed to condenser 212 via line 216. The vapor refrigerant and liquid/vapor mixture are condensed before flowing from condenser 212 through valve 218 to evaporator 220 via lines 222 and 224. The liquid portion of the mixture from condenser 212 is evaporated in evaporator 220 with heat, Q3, absorbed from the environment. Finally, the low pressure, refrigerant vapor flows from evaporator 220 via line 226 to remix with weak solution in absorber 184. Heat, Q4, is given off and strong solution is formed to renew the cycle.

The double effect system of FIG. 5 also ordinarily includes heat exchangers. For the sake of clarity, they are not shown. Ordinarily, however, a first heat exchanger includes lines 188 and 198, while a second heat exchanger includes lines 222 and 226.

Figure 6:
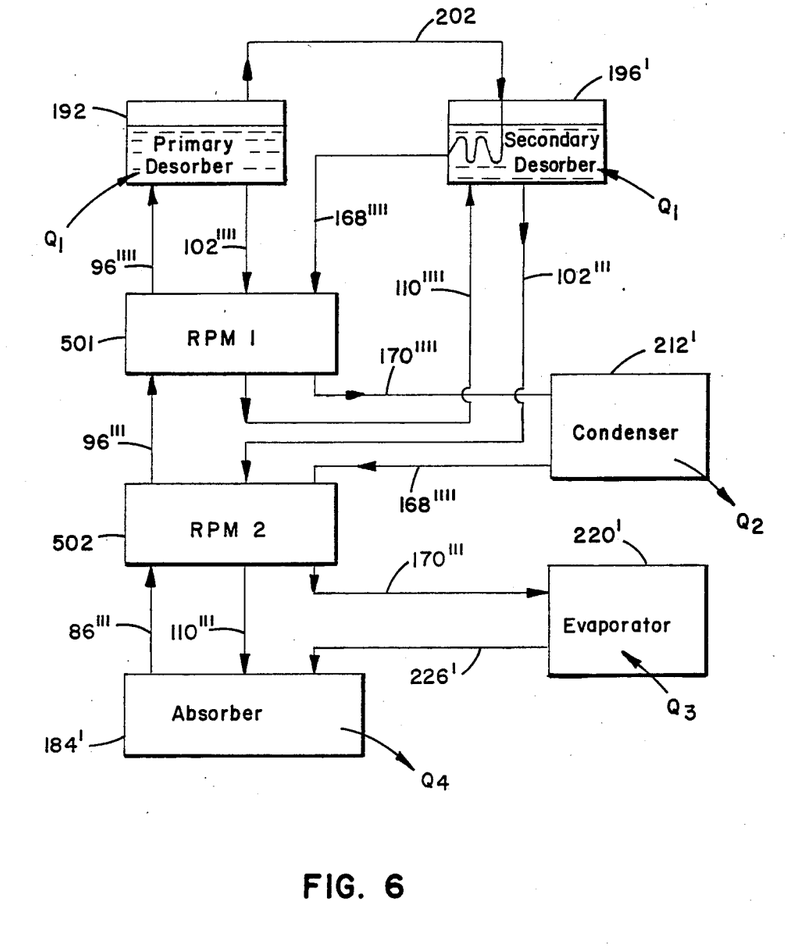
FIG. 6 is a schematic illustration of the system of FIG. 5 wherein energy recovery pump-motors in accordance with the present invention have replaced the valves and pump of the prior art system.

As shown in FIG. 6, two energy recovery pump-motors 50 may be used in a double effect system to replace the valves and pump. The first pump-motor 50 replaces valves 194 and 210, as well as providing some of the pumping capacity. The second pump-motor 50 replaces valves 204 and 218 and provides the remainder of needed pumping capacity. Each pump-motor 50 is exactly the same as that disclosed in FIGS. 4a and 4b.

Low pressure, strong solution is directed via line 86″ from absorber 184′ to the second of pump-motors 50, identified by the numeral 502. The first liquid leaves pump-motor 502 at a higher pressure via line 96‴ and is input into the first of pump-motors 50, identified by the numeral 501. After being elevated to a still higher pressure, first liquid leaves pump-motor 501 via line 96⁗ and is directed to primary desorber 192′. High pressure intermediate solution is directed from primary desorber 192′ to pump-motor 501 via line 102⁗. After yielding some of its energy, intermediate solution flows from pump-motor 501 via line 110⁗ to secondary desorber 196′. From secondary desorber 196′, the now weak solution having an intermediate pressure level is directed via line 102‴ to pump-motor 502. After yielding the rest of its hydraulic energy, weak solution leaves pump-motor 502 at a low pressure level and flows via line 110‴ to absorber 184′.

Vapor refrigerant is directed from primary desorber 192′ to secondary desorber 196′ via line 202′. The high pressure, now liquid refrigerant, continues to flow from secondary desorber 196′ to pump-motor 501 via line 168⁗. After giving up its work potential at pump-motor 501, the vapor/liquid mixture flows via line 170⁗ to condenser 212′. From condenser 212′, the liquid refrigerant at an intermediate pressure level flows via line 168‴ to pump-motor 502 to expend additional expansion energy and then flow via line 170‴ to evaporator 220′. From evaporator 220′, the now evaporated refrigerant is directed via line 226′ to absorber 184′ to be remixed with weak solution to recharge the system and continue the cycle.

The energy recovery pump-motor of the present invention is advantageous within a double effect absorption system for the same reasons that it is advantageous in a single effect absorption system described with respect to FIG. 2. Additionally, use of a pair of pump-motors 50 in a double effect system reduces energy loss as low grade heat at condenser 212′ by extracting the energy as useful work at pump-motor 501. In other words, the fluid mixture entering the condenser has a greater percentage of liquid than would otherwise be the case if pump-motor 501 were not in the system. There is thus proportionately less vapor to be condensed. Therefore, less heat, Q2, is given off and system efficiency is increased.

Thus, a number of systems showing application for the energy recovery device of the present invention and the advantages of the device within each particular system have been described in detail. It is understood, however, that many additional applications are likely and are also understood to comprise the invention as equivalents.

Structural Relationships

When incorporating an energy recovery pump-motor 50 in a particular fluid system, a thermodynamic analysis of the system must be done in order to size the various components with respect to temperature, pressure, volume, change of phase, etc., of fluid as it cycles through the system. For the purpose of the present disclosure, it is sufficient to present the relationships appropriate for sizing a pump-motor 50 relative to system parameters which would become known after doing the indicated thermodynamic analysis.

Figure 7:
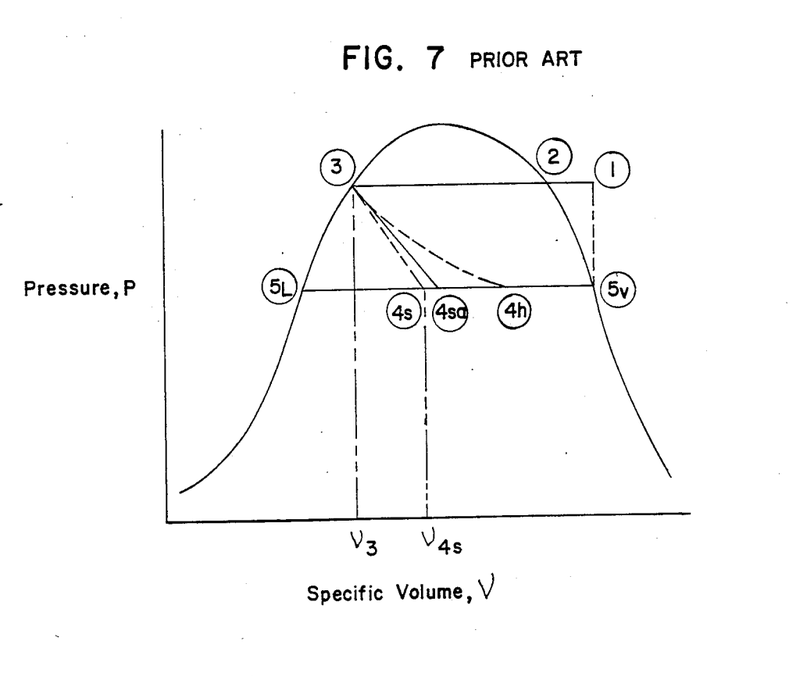
FIG. 7 illustrates a typical pressure versus specific volume phase diagram for an absorption refrigeration system.

The system parameter to which the size of the various elements of the pump-motor 50 will be related is specific volume, having units of volume/mass. A phase diagram of pressure versus specific volume is shown in FIG. 7 and has been drawn with reference to an absorption refrigeration system of the types described hereinbefore. With respect to a phase diagram, it is noted that the state of a substance can be conclusively determined by considering a horizontal line which starts at the left vertical margin of the chart, passes through the characteristic dome, and continues toward the right out of the dome. States along the line to the left of the dome are subcooled liquid. A subcooled liquid requires some quantity of heat to increase its temperature before it can begin to form a vapor. The point where the line contacts the left side of the dome is the point where vapor is just about to form. At this point, the liquid is saturated and on the addition of more heat at a constant pressure, vapor will form. As the line proceeds through the dome, more and more vapor is generated until the right side of the dome is reached. At that point all the substance is vapor. From that point to the right, the substance becomes superheated vapor.

With reference to FIGS. 1 and 7, circle 1 indicates the fluid material state of the vapor in the desorber. Circle 2 indicates the state of the vapor refrigerant as it enters the condenser. Circle 3 indicates the state of the liquid refrigerant as it leaves the condenser. Circle $4h$ indicates the liquid/vapor mixture after passing through a valve. Circle $5v$ shows the state of the mixture after being completely evaporated by the evaporator. The broken line leading from circle $5v$ to circle 1 depicts the various processes taking place between the evaporator and the circle 1 state at the desorber as the cycle continues. It is noted that circle $4h$ represents an ideal valve, while circle $4s$ represents an ideal mixed-phase motor. Circle $4sa$ represents an actual mixed-phase motor 54. That is, an actual motor 54 includes various inefficiencies. In any case, it is clear from the study of thermodynamics that while a valve is effective to control pressure in absorption refrigeration systems, work is lost at the valve. A liquid passing through a valve loses flow-work or hydraulic pressure energy irreversibly to heat. A vapor or a liquid which is changing phase loses energy as it depressurizes through an irreversible expansion. A pump-motor 50 recovers both flow work energy and expansion energy. The recovery of expansion energy results in the movement to the left of the fluid represented by state circle $4sa$ relative to state circle $4h$.

Two relationships are readily developed for relating specific volumes to the various diameters of pump 52 and motor 54 of pump-motor 50. With respect to motor 54, it is observed that the mass of saturated liquid entering motor 54 is conserved and is the same as the mass of mixed-phase liquid/vapor exhausting motor 54. On expressing the volume of substance in terms of mass and specific volume and observing that the initial and final masses are constant, the following relationship governs: (see FIGS. 4A and 7):

$$\frac{v_3}{v_{4sa}} = \frac{d_1^2 - d_2^2}{d_1^2 - d_0^2}$$

It is noted that symmetry for both sides of both pump 52 and motor 54 is preferred so that opposite sides of each device operate 108° out of phase with one another.

To develop a relationship relating parameters of pump 52 and motor 54, conservation of mass is again used. It is noted that the mass flow rate of strong solution must equal the mass flow rate of weak solution and of refrigerant. On expressing mass flow rate in terms of specific volume, piston face area and piston velocity, the following relationship results:

$$\frac{v_{ss}}{v_{ws}} \times \frac{d_3^2 - d_4^2}{d_3^2 d_0^2} + \frac{v_{ss}}{v_{4s}} \times \frac{d_1^2 - d_0^2}{d_3^2 d_0^2} = 1$$

In the case where there is only an energy recovery pump 52 in the system, $d_0$ and $d_1$ equal zero and the first of the above equations is not relevant.

With respect to system 180 wherein only pump 52' is incorporated in an absorption refrigeration system, again a relationship between system parameters and various diameters of pump components can be developed using the conservation of mass principle. By equating the mass flow rate of strong solution at pump 52' to the mass flow rate of weak solution at pump 52' plus the mass flow rate of refrigerant which can readily be obtained at the exhaust port of condenser 24', and rewriting the mass flow rates in terms of relevant component diameters and system specific volumes, the following rationship results (see FIGS. 4A and 7):

$$\frac{d_1^2}{v_1} = \frac{d_1^2 - d_2^2}{v_2} + \frac{d_2^2}{v_3}$$

Thus, the energy recovery pump-motor 50 of the present invention has been described in detail and related to a number of system applications. Furthermore, advantages of the invention and its applications have been noted and relationships provided for sizing the invention relative to a particular system. It is understood, however, that the invention is conceptual and that numerous equivalents are possible. Consequently, it is further understood in conclusion that any changes made from the disclosure as presented, especially in matters of design, shape, size and arrangement of parts to the full extent extended by the general meaning of the terms in which the appended claims are expressed, are within the principle of the invention.

What is claimed is:

1. An absorption refrigeration and/or heating system, comprising:

a desorber which absorbs heat and at a high relative pressure vaporizes a first volume of refrigerant from a second volume of strong solution leaving a third volume of weak solution;

a condenser which releases heat and condenses the vapor refrigerant to liquid refrigerant at said high pressure;

an evaporator which absorbs heat and evaporates said liquid refrigerant at a low relative pressure;

an absorber which releases heat and absorbs said evaporated refrigerant into said weak solution at said low pressure to form said strong solution;

means for fluidly communicating said strong solution from said absorber to said desorber, said weak solution from said desorber to said absorber, said high pressure vapor refrigerant from said desorber to said condenser, said liquid refrigerant from said condenser to said evaporator, and said low pressure evaporated refrigerant from said evaporator to said absorber, said communicating means including first means for recovering hydraulic and expansion energy from said high pressure, liquid refrigerant, said communicating means also including means for recovering energy from said high pressure weak solution to pump said low pressure, strong solution thereby reducing pressure in said weak solution and increasing pressure in said strong solution, said energy recovering means including first and second aligned cylinders with first and second pistons therein, respectively, said pistons being connected together with a rod, said cylinders having a first diameter and said rod having a second diameter, said cylinder first diameter squared to the specific volume of strong solution forming a first ratio, said cylinder first diameter squared to the specific volume of weak solution forming a second ratio, said rod second diameter squared to the specific volume of refrigerant forming a third ratio, said first ratio being equal to the sum of said second and third ratios.

2. The system in accordance with claim 1 wherein said first and second pistons divide said first and second cylinders into first and second driving and pumping chambers, respectively, said rod which connects said pistons together passing through said driving chambers, said communicating means including first means for fluidly connecting said absorber to said first and second pumping chambers through first and second check valves, respectively, opening in a flow direction leading to said particular pumping chamber, said communicating means also including second means for fluidly connecting said first and second pumping chambers to said desorber through third and fourth check valves, respectively, opening in a flow direction leading from said particular pumping chamber, said energy recovering means further including a four-way, two position valve, said valve in a first position placing said first driving chamber in fluid communication with said desorber and said second driving chamber in fluid communication with said absorber and vice versa in a second position, said energy recovering means still further including means for sensing said pistons near ends of travel in said cylinders.

3. The system in accordance with claim 1 including a motor having a third cylinder and a third piston dividing the third cylinder into a charging chamber and an exhaust chamber, said motor also having means for moving said third piston through a charging stroke and a power stroke, said moving means including first means for selectively placing said condensor and said charging chamber in fluid communication with one another to at least help move said third piston through the charging stroke and placing said exhaust chamber in fluid communication with said evaporator, said moving means further including second means for selectively placing said charging and exhaust chambers in fluid communication with one another to form one motor chamber and allow said high pressure, liquid refrigerant therein to expand and partially change phase to move said third piston through the power stroke, said system still further including a drive shaft connecting said third piston and one of said first and second pistons, said drive shaft having a cross-sectional area, said energy recovering means including dummy shaft means for extending from the other of said first and second piston to a wall of said cylinder opposite said other piston at all points along the travel of said other piston, said dummy shaft means having a cross-sectional area the same as said drive shaft, said system also including synchronizing means for switching the direction of travel of said first and second pistons at the same time as said moving means switches between said first and second placing means.

4. The system in accordance with claim 3 wherein said first and second placing means includes a valve having first and second positions, said first placing means including said valve in said first position, said second placing means including said valve in said second position.

5. The system in accordance with claim 2 including a motor having third and fourth cylinders and third and fourth pistons dividing said third and fourth cylinders into first and second charging chambers and first and second exhaust chambers, respectively, said motor also having a main shaft attaching at opposite ends to said third and fourth pistons and a drive shaft attaching at one end to one of said third and fourth pistons and at an opposite end to one of said first and second pistons of said energy recovering means, said motor further having a six-way, two position valve, said valve having a first position placing said condensor and said first charging chamber in fluid communication with one another and placing said first exhaust chamber and said evaporator in fluid communication with one another and placing said second charging and exhaust chambers in fluid communication with one another to form a second motor chamber, said second piston moving in a power stroke and said first piston moving in a charging stroke with said valve in said first position, said valve also having a second position placing said first charging and exhaust chambers in fluid communication with one another to form a first motor chamber and placing said condensor and said charging chamber in fluid communication with one another and placing said second exhaust chamber and said evaporator in fluid communication with one another, said first piston moving in a power stroke and said second piston moving in a charging stroke when said valve is in said second position, said system also including means for switching said four way valve of said energy recovering means and said six-way valve of said motor at the same time, said drive shaft having a cross-sectional area, said energy recovering means including dummy shaft means for extending from the other of said first and second pistons than is attached to said drive shaft to a wall of said cylinder opposite said other piston, said dummy shaft extending means having the same cross-sectional area as said drive shaft.

6. The system in accordance with claim 5 including second dummy shaft means for extending from the other of said third and fourth pistons than is attached to said drive shaft to a wall of said cylinder opposite said other piston, said second dummy shaft extending means being the same cross-sectional diameter as said drive shaft and said first dummy shaft extending means.

7. An absorption refrigeration and/or heating system, comprising:
a desorber which absorbs heat and at a high relative pressure vaporizes a first volume of refrigerant from a second volume of strong solution leaving a third volume of weak solution;
a condenser which releases heat and condenses the vapor refrigerant to liquid refrigerant at said high pressure;
an evaporator which absorbs heat and evaporates said liquid refrigerant at a low relative pressure;
an absorber which releases heat and absorbs said evaporated refrigerant into said weak solution at said low pressure to form said strong solution;
means for fluidly communicating said strong solution from said absorber to said desorber, said weak solution from said desorber to said absorber, said high pressure vapor refrigerant from said desorber to said condenser, said liquid refrigerant from said condenser to said evaporator, and said low pressure evaporated refrigerant from said evaporator to said absorber, said communicating means including means for recovering energy from said high pressure liquid refrigerant thereby reducing its pressure and for recovering energy from said high pressure weak solution thereby reducing its pressure so as to pump said strong solution and increase its pressure, said energy recovering means including:
a pump with a driving chamber and a pumping chamber and first means for reciprocating to simultaneously increase the size of one of said driving and pumping chambers and decrease the size of the other, said pump having means for filling said pumping chamber with strong solution at a lower pressure, said pump further having means for driving said first reciprocating means in a pumping stroke with weak solution at a higher pressure in said driving chamber, said pump including means for releasing said strong solution from said pumping chamber during said pumping stroke, said pump also including first means for returning said first reciprocating means in a filling stroke, said pump further including first means for exhausting said weak solution from said driving chamber during said filling stroke;

a motor with a charging chamber and an exhausting chamber and second means for reciprocating to simultaneously increase the size of one of said charging and exhausting chambers and decrease the other, said motor having means for charging said charging chamber with a liquid refrigerant at a higher pressure, said motor further having means for allowing expansion of said liquid refrigerant into said exhausting chamber to change phase and form a vapor and liquid mixture to drive said second reciprocating means in a power stroke, said motor including second means for exhausting spent liquid and vapor refrigerant at a lower pressure from said exhausting chamber during a charging stroke, said motor further including second means for returning said second reciprocating means in said charging stroke;

means for connecting said first and second reciprocating means for simultaneous movements; and means for switching from one pump stroke to another and from one motor stroke to another at the same time.

* * * * *

UNITED STATES PATENT AND TRADEMARK OFFICE
CERTIFICATE OF CORRECTION

PATENT NO. : 4,793,153

DATED : December 27, 1988

INVENTOR(S) : Richard D. Hembree and David E. E. Carmein

It is certified that error appears in the above-identified patent and that said Letters Patent is hereby corrected as shown below:

Column 1, line 65, delete "thus," and insert therefore-- Thus,--.

Column 2, line 61, delete "stoke" and insert therefore-- stroke--.

Column 5, line 37, after "fills" insert--with low pressure, first liquid. At the same time, low--.

Column 5, line 55, after "switch" insert --122--.

Column 9, line 60, delete "108" and insert therefore--180--.

Column 15, line 45, delete "piston" and insert therefore- pistons--.

Signed and Sealed this

Twenty-fifth Day of July, 1989

Attest:

DONALD J. QUIGG

*Attesting Officer*  *Commissioner of Patents and Trademarks*